May 21, 1968     R. J. BRESSON     3,383,995
BULB SENSING MEANS
Filed Aug. 23, 1965
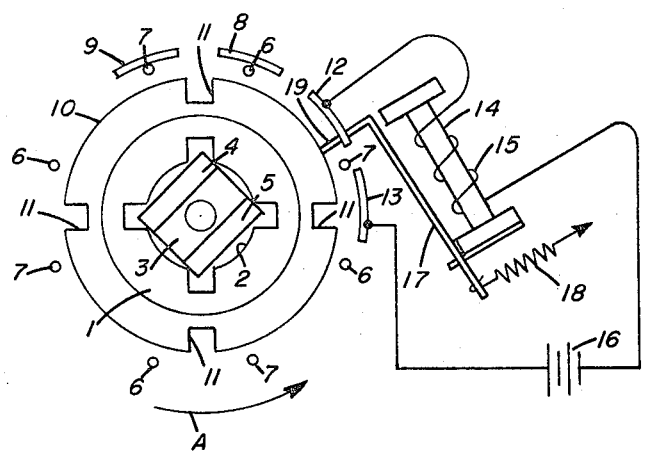
RICHARD J. BRESSON
INVENTOR.
BY *R. Frank Smith*
*Thomas R. Lampe*
ATTORNEYS United States Patent Office 3,383,995
Patented May 21, 1968

3,383,995
BULB SENSING MEANS
Richard J. Bresson, Rochester, N.Y., assignor to Eastman Kodak Company, Rochester, N.Y., a corporation of New Jersey
Filed Aug. 23, 1965, Ser. No. 481,872
7 Claims. (Cl. 95—11.5)

ABSTRACT OF THE DISCLOSURE

A photographic device having a bulb sensing structure including a socket for receiving an indexable multilamp flash attachement, and an electrical circuit for sensing the condition of a bulb prior to placement of the bulb into a firing position and for indicating the sensed condition as by preventing a bad bulb from being moved into the firing position.

---

This invention relates to a bulb sensing means for use with cameras adapted for use with rotatable, disposable, multilamp flash attachments. An attachment of this type is disclosed in copending Peterson et al. U.S. application Ser. No. 417,913, now Patent No. 3,353,465, filed Dec. 14, 1964.

With the advent of cameras utilizing this type of attachment it is desirable to provide some means whereby the operator may be made aware of the fact that the flash lamps to be placed successively in the camera synchroflash circuit are in good working order and have not been previously used by the operator. One such means is disclosed in the copending Harvey U.S. application Ser. No. 471,012, filed July 12, 1965, which discloses visual signal means to indicate to the operator the number of succesive good lamps remaining in a multilamp flash attachment. An arrangement of this type requires a continual awareness by the operator of the signal means so that inadvertant actuation of the camera shutter and synchroflash system is prevented when a previously used or defective lamp is in firing position. Furthermore, there is a possibility that the visual signal means employed in such a system will burn out, thus destroying the effectiveness of the arrangement.

It is accordingly an object of the present invention to provide means for sensing the condition of a flash lamp in a multilamp flash attachment prior to said lamp being placed in operative association with a camera synchroflash system.

An additional object is to provide positive locking means for preventing movement of a defective or used lamp into firing position, such cessation of movement serving to indicate to the operator the inoperative condition of the lamp.

The above objects have been attained in the present invention by providing an electrical sensing means for sensing the condition of a lamp prior to movement thereof into operative association with a camera synchroflash system and relay means actuated in response to said sensing means to halt movement of the associated multilamp attachment and lamp so that association with the synchroflash circuit of the inoperative lamp is prevented.

Other objects of the invention will appear from the following description, reference being made to the accompanying drawing wherein a simplified, partially schematic plan view is presented showing the lamp sensing and positive locking means employed in the present invention.

Referring now to the drawing, a rotatable, circular socket member 1 is disclosed having an irregularly shaped aperture 2 therein. A spring clip member 3 is disposed in socket member 1, said clip member having a pair of upstanding, yieldable arms 4, 5 adapted to engage and releasably maintain a projection on an associated, multilamp flash attachment (not shown). A socket member of this type is disclosed in aforementioned U.S. application Ser. No. 419,913 and such application may be consulted for specific details of operation. For the purposes of properly understanding the operation of the present invention, it is necessary to be aware only that as the socket member turns, the associated multilamp attachment (not shown) will rotate a like degree due to the interengagement between clip member 3 and the cooperating projection element (not shown) on the multilamp flash attachment.

When the multilamp flash attachment is seated in the socket member in the manner taught in aforementioned U.S. application Ser. No. 417,913, wire leads 6, 7 project downwardly and in radial fashion about the socket member for selectively positioning the forward facing lamp in the multilamp attachment in circuit with the camera synchroflash system. In the drawing, the positions assumed by the respective lead wires 6, 7, corresponding to each of the four flash lamps (not shown) in the rotatable flash attachment, are shown when said attachment is in firing position.

One pair of wire leads 6, 7 touch a pair of bulb firing contacts 8, 9 in the manner shown when the attachment is in firing position. Firing contacts 8, 9 are connected in any known manner to a conventional camera synchroflash circuit (not shown) so that the lamp corresponding to wire leads 6, 7 which are in contact with firing contacts 8, 9 is fired upon depression of the camera shutter release.

Disposed below socket member 1 and fixedly attached thereto in any desired manner is a circular control plate 10 having a series of notches 11 about the periphery thereof. The socket member 1 and control plate 10 are adapted to be rotatably indexed in 90° increments after the lamp which was placed in operative association with the camera synchroflash system has been fired. One suitable arrangement for indexing the socket and control member is disclosed in copending Williams et al. U.S. application Ser. No. 438,585, now Patent No. 3,335,651, filed Mar. 10, 1965. As may be seen with reference to U.S. application Ser. No. 438,585, a drive mechanism for rotatably indexing a multilamp flash attachment is disclosed which incorporates a slip clutch mechanism. Motive power for the drive mechanism is provided by the camera film winding spool. A suitable escapement device restricts rotation of the socket means and associated multilamp attachment to 90° regardless of the degree of rotation of the film winding spool, with relative movement of the friction plate elements of the slip clutch providing the necessary slippage.

Also disposed about the periphery of socket member 1 and control plate 10 are a pair of bulb condition sensing contacts 12, 13. Sensing contacts 12, 13 are so positioned that they are adapted to touch wire leads 6, 7 of successive lamps as they move by due to the rotation of the socket member and associated multilamp attachment.

Disposed adjacent said socket member 1 is an electromagnetic control relay comprising preferably a soft-iron core 14 and a coil 15 wound thereon. One end of coil 15 is connected to sensing contact 12. The other end of the coil is connected to a battery 16 which is in turn connected by a wire lead to sensing contact 13 in the manner shown. It may thus be seen that when an electrical connection is established between sensing contact 12 and sensing contact 13, a circuit is completed and coil 15 is energized. Upon energization of the coil a spring biased armature 17 is attracted to soft-iron core 14 against the bias of spring 18.

The operation of the above device will now be described. As previously stated, the device is illustrated with one lamp, i.e. the lamp having wire leads 6, 7 contacting lamp firing contacts 8, 9 in firing position. When the device is in such position, armature 17 is biased in a counterclockwise direction under the influence of spring 18 and a portion thereof contacts the periphery of control plate 10 in the manner shown.

Assuming now that the forward facing lamp has been fired and the mechanism is being indexed to bring a succeeding lamp into firing position, socket member 1 and control plate 10 will commence rotation in the direction of arrow A. Lead wires 6, 7 of the succeeding lamp to be placed in firing position will thereupon contact sensing contacts 12, 13 in a readily apparent manner. If the lamp corresponding to lead wires 6, 7 which are in communication with sensing contacts 12, 13 is in good operating condition, an electrical connection will be completed between contacts 12, 13 through the unfired flash lamp. A circuit will then be completed and current will flow through coil 15, thus energizing soft iron core 14 and moving armature 17 in a clockwise direction against the bias of spring 18. Such movement withdraws projection 19 of armature 17 from circular control plate 10. It is of course understood that coil 15 has sufficient resistance to prevent the flash lamp from firing. Since, in this instance, armature 17 has been withdrawn from the control plate, the plate and socket member move unrestrained in the usual manner to place the tested lamp into firing position. Wire leads 6, 7 of the tested lamp move past contacts 12, 13 and are positioned so that they communicate with firing contacts 8, 9.

If, however, upon initial movement of the socket member, the wire leads 6, 7 of a used or defective flash lamp engage sensing contacts 12, 13, the circuit would not then be completed through the lamp. Therefore, spring 18 would maintain armature 17 in sliding engagement with control plate 10. The plate continues to move in the direction of arrow A until a notch 11 arrives in the vicinity of projection 19 of armature 17. At that stage of the operation projection 19 enters the notch and prevents further movement of the socket member 1 and control plate 10. The movement of the associated multilamp flash attachment (not shown) is also halted and the attachment assumes a position of rest which differs from its normal firing position, thus indicating to the operator that the next to be fired lamp is in a defective or inoperative condition.

Upon stoppage of the device in the manner above described due to a defective or inoperative lamp, the operator may release the socket member and control plate from their locked positions by removing the multilamp flash attachment and inserting a new one with fresh flash lamps therein. A circuit will immediately be completed through the lamp which communicates with sensing contacts 12, 13. Projection 19 of armature 17 will be withdrawn from notch 11 upon energization of the coil in the manner previously described. The operator may then manually rotate the socket member and associated multilamp flash attachment so that a lamp is placed in firing position, i.e. the lead wires 6, 7 thereof communicate with bulb firing contacts 8, 9.

The invention has been described in detail with particular reference to preferred embodiments thereof, but it will be understood that variations and modifications can be effected within the spirit and scope of the invention as described hereinabove and as defined in the appended claims.

What is claimed is:

1. In a photographic camera of the type for use with an indexable multilamp flash attachment, the combination comprising:
   a socket assembly selectively indexable from a first position to a second position and adapted to receive said attachment;
   sensing means for sensing the condition of at least one lamp in said flash attachment as said socket assembly is indexed from said first position to said second position;
   locking means in operative association with said socket assembly to prevent movement thereof to said second position when said sensing means detects an inoperative lamp and to permit movement of said socket assembly to said second position when an operative lamp is sensed.

2. The combination according to claim 1 wherein said sensing means includes a pair of sensing contacts for selectively engaging the lead wires of at least one of said lamps as said socket assembly is indexed from said first position to said second position.

3. The combination according to claim 1 wherein said locking means comprises an electromechanical transducer mechanism operatively associated with said sensing means.

4. In a photographic camera of the type for use with an indexable multilamp flash attachment, the combination comprising:
   a rotatable socket assembly selectively indexable from a first position to a second position;
   a control plate connected to said socket assembly for rotation therewith, said control plate having at least one notch therein;
   said second assembly adapted to receive said multilamp attachment;
   means responsive to movement of said socket assembly from said first position to said second position to sense the condition of a lamp in said multilamp attachment and selectively engage said notch in accordance with the sensed condition of said lamp, thereby positively preventing movement of said socket assembly to said second position when said lamp is inoperative.

5. The combination according to claim 4 wherein said means comprises a pair of sensing contacts adapted to engage the lead wires of said lamp upon movement of said socket assembly from said first position to said second position;
   said contacts being operatively associated with an electromechanical transducer mechanism to selectively energize same;
   said transducer mechanism including a movable member cooperating with said control plate to enter into said notch when said lamp is in an inoperative condition.

6. The combination according to claim 5 wherein a second pair of contacts is disposed to engage the wire leads of said lamp when said socket assembly is in said second position;
   said second pair of contacts constituting a portion of a synchroflash circuit in said camera.

7. In a photographic device of the type for use with an indexable multilamp flash attachment comprising a plurality of lamps, the combination comprising:
   first contact means engageable with a lamp of said attachment to fire the lamp;

a socket assembly for selectively indexing said attachment to sequentially place the lamps in engagement with the first contact means;

second contact means engageable with each lamp during indexing and before engagement of the lamp with the first contact means;

sensing means for sensing the condition of each lamp in said attachment upon engagement with said second contact means; and means responsive to said sensing means for indicating to the operator said sensed condition.

References Cited

UNITED STATES PATENTS

| | | | |
|---|---|---|---|
| 2,258,575 | 10/1941 | MacKay | 240—37.1 |
| 2,625,863 | 1/1953 | Kirwin | 95—11.5 |
| 3,312,086 | 4/1967 | Casebeer et al. | 95—11.5 XR |

NORTON ANSHER, *Primary Examiner.*

F. L. BRAUN, *Assistant Examiner.*

UNITED STATES PATENT OFFICE
CERTIFICATE OF CORRECTION

Patent No. 3,383,995                                              May 21, 1968

Richard J. Bresson

It is certified that error appears in the above identified patent and that said Letters Patent are hereby corrected as shown below:

Column 4, line 43, "second" should read -- socket --.

Signed and sealed this 14th day of October 1969.

(SEAL)
Attest:

Edward M. Fletcher, Jr.                         WILLIAM E. SCHUYLER, JR.
Attesting Officer                                       Commissioner of Patents